(12) United States Patent
Shiina et al.

(10) Patent No.: US 9,374,007 B2
(45) Date of Patent: *Jun. 21, 2016

(54) DC/DC CONVERTER

(71) Applicant: Seiko Instruments Inc., Chiba-shi, Chiba (JP)

(72) Inventors: Yoshiomi Shiina, Chiba (JP); Masayuki Uno, Ina (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 1 day.

This patent is subject to a terminal disclaimer.

(21) Appl. No.: 14/643,824

(22) Filed: Mar. 10, 2015

(65) Prior Publication Data
US 2015/0263622 A1 Sep. 17, 2015

(30) Foreign Application Priority Data

Mar. 11, 2014 (JP) .................................. 2014-047938
Nov. 21, 2014 (JP) .................................. 2014-237010

(51) Int. Cl.
*H02M 3/157* (2006.01)
*H02M 3/158* (2006.01)
*H02M 1/15* (2006.01)
*H02M 3/156* (2006.01)

(52) U.S. Cl.
CPC ................ *H02M 3/158* (2013.01); *H02M 1/15* (2013.01); *H02M 3/1563* (2013.01)

(58) Field of Classification Search
CPC ... H02M 3/156; H02M 3/157; H02M 3/1588; H02M 3/158; Y02B 70/14666
USPC .......................... 323/282, 283, 284, 285, 288
See application file for complete search history.

(56) References Cited

U.S. PATENT DOCUMENTS

| 7,145,317 B1* | 12/2006 | Shah ...................... | H02M 3/156 323/288 |
| 8,823,352 B2* | 9/2014 | Zhang ..................... | H02M 1/14 323/271 |
| 8,872,497 B2* | 10/2014 | Nakashima ............. | H02M 1/14 323/285 |
| 2014/0239924 A1* | 8/2014 | Guo ......................... | G05F 1/46 323/271 |

FOREIGN PATENT DOCUMENTS

JP 2011-182533 A 9/2011

* cited by examiner

*Primary Examiner* — Gary L Laxton
(74) *Attorney, Agent, or Firm* — Brinks Gilson & Lione

(57) ABSTRACT

Provided is a DC/DC converter that is capable of performing stable control without being affected by noise from an output voltage and without any malfunction and is capable of operating at a relatively constant frequency. The DC/DC converter includes an ON-timer circuit configured to input a control signal, which is synchronized with a signal input to a gate of an output transistor, and output an ON-time signal. The ON-timer circuit includes: a ripple generation circuit configured to generate and output a ripple component based on the control signal; an averaging circuit configured to output a signal obtained by averaging the ripple component; and a timer circuit configured to generate and output the ON-time signal based on the signal of the averaging circuit and the control signal.

6 Claims, 7 Drawing Sheets

DC/DC CONVERTER

RELATED APPLICATIONS

This application claims priority under 35 U.S.C. §119 to Japanese Patent Application Nos. 2014-047938 filed on Mar. 11, 2014 and 2014-237010 filed on Nov. 21, 2014, the entire contents of which are hereby incorporated by reference.

BACKGROUND OF THE INVENTION

1. Field of the Invention

The present invention relates to a DC/DC converter configured to convert a DC voltage, and more particularly, to a DC/DC converter including a timer circuit.

2. Description of the Related Art

A related-art DC/DC converter is now described. FIG. 7 is a circuit diagram illustrating the related-art DC/DC converter.

The related-art DC/DC converter includes a comparator 504, an RS-FF circuit 113, a drive circuit 110, a reference voltage generation circuit 503, a timer circuit 501, NMOS transistors 108 and 109, a capacitor 107, a coil 106, resistors 103, 104, and 502, a ground terminal 100, an output terminal 102, and a power supply terminal 101.

The comparator 504 has an inverting input terminal for inputting a divided voltage obtained by dividing an output voltage Vout of the output terminal 102 and a non-inverting input terminal for inputting a reference voltage obtained by adding a ripple voltage, which depends on a power supply voltage and the output voltage Vout, and a slope voltage, which changes with a predetermined slope, to each other. The comparator 504 outputs a signal corresponding to the result of comparison. When the divided voltage is higher than the reference voltage, the comparator 504 outputs a signal of Low level to a set terminal of the RS-FF circuit 113. When the divided voltage is lower than the reference voltage, the comparator 504 outputs a signal of High level to the set terminal of the RS-FF circuit 113. A reset terminal of the RS-FF circuit 113 is supplied with a signal output from the timer circuit 501. An output signal is output from a Q terminal of the RS-FF circuit 113 in accordance with the output signal of the comparator 504 and the output signal of the timer circuit 501. The drive circuit 110 controls on and off of the NMOS transistors 108 and 109 in response to the signal from the RS-FF circuit 113, to thereby generate the output voltage Vout from the output terminal 102 (see, for example, Japanese Patent Application Laid-open No. 2011-182533).

In the related-art DC/DC converter, however, the reference voltage is generated based on the output voltage Vout, and hence there is a problem in that control is susceptible to noise from the output voltage Vout and is therefore liable to be unstable.

SUMMARY OF THE INVENTION

The present invention has been made in view of the above-mentioned problem, and provides a DC/DC converter that is capable of performing stable control without being affected by noise from an output voltage Vout and without any malfunction and is capable of operating at a relatively constant frequency.

In order to solve the problem in the related art, a DC/DC converter according to one embodiment of the present invention is configured as follows.

The DC/DC converter includes an ON-timer circuit configured to input a control signal, which is synchronized with a signal input to a gate of an output transistor, and output an ON-time signal. The ON-timer circuit includes: a ripple generation circuit configured to generate and output a ripple component based on the control signal; an averaging circuit configured to output a signal obtained by averaging the ripple component; and a timer circuit configured to generate and output the ON-time signal based on the signal of the averaging circuit and the control signal.

The DC/DC converter according to one embodiment of the present invention is capable of operating the timer circuit without using the output voltage Vout, and hence an ON-time can be prevented from being shifted due to noise of the output voltage Vout. Further, the ON-time signal can be controlled by the duty ratio, and hence the DC/DC converter is capable of operating at a constant operating frequency.

DETAILED DESCRIPTION OF THE PREFERRED EMBODIMENT

Now, an embodiment of the present invention is described with reference to the accompanying drawings.

Figure 1:
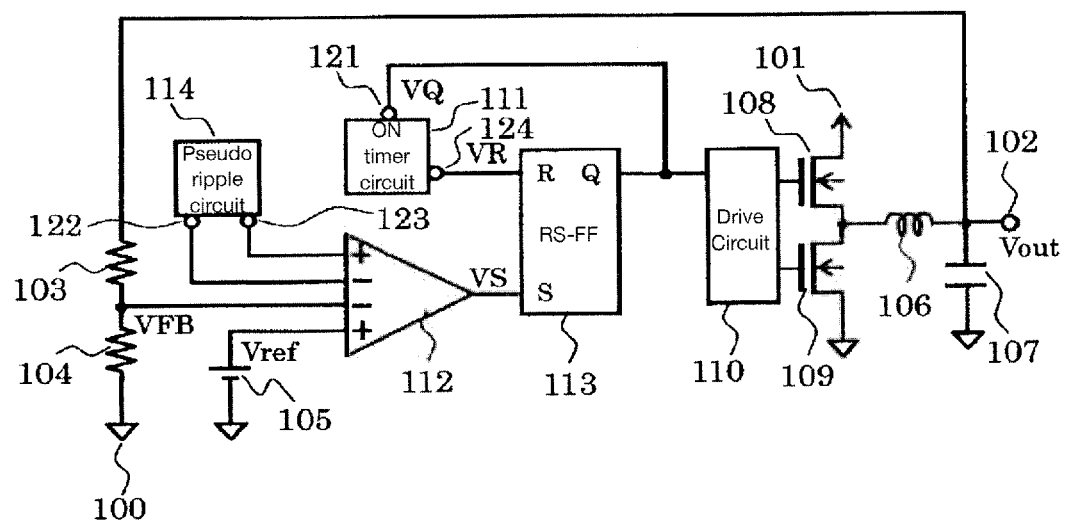
FIG. 1 is a circuit diagram illustrating a configuration of a DC/DC converter according to an embodiment of the present invention.

FIG. 1 is a circuit diagram of a DC/DC converter according to this embodiment.

The DC/DC converter according to this embodiment includes a comparator 112, an RS-FF circuit 113, a pseudo ripple circuit 114, a drive circuit 110, a reference voltage circuit 105, an ON-timer circuit 111, NMOS transistors 108 and 109, a capacitor 107, a coil 106, resistors 103 and 104 forming a voltage dividing circuit, a ground terminal 100, an output terminal 102, and a power supply terminal 101.

Figure 2:
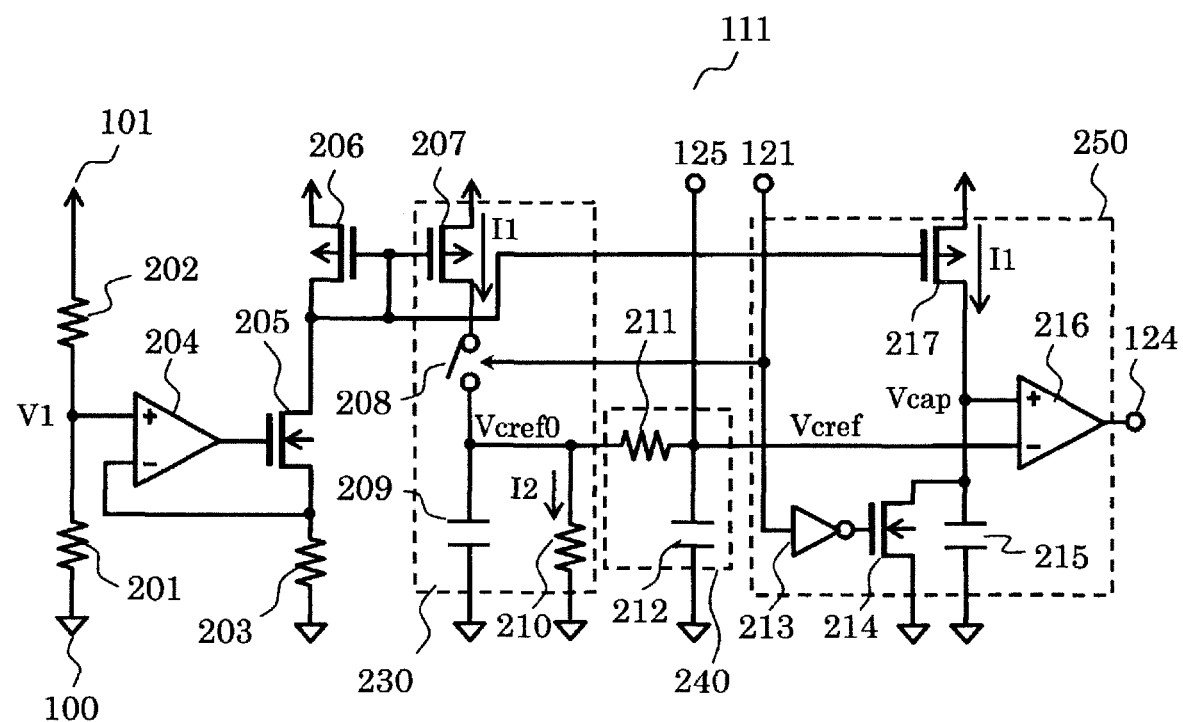
FIG. 2 is a circuit diagram illustrating a configuration of an ON-timer circuit of the DC/DC converter according to this embodiment.

FIG. 2 is a circuit diagram illustrating a configuration of the ON-timer circuit 111. The ON-timer circuit 111 includes resistors 202, 201, and 203, an amplifier 204, an NMOS transistor 205, a PMOS transistor 206, a ripple generation circuit 230, an averaging circuit 240, a timer circuit 250, an input terminal 121, an output terminal 124, and an output terminal 125. The ripple generation circuit 230 includes a PMOS transistor 207, a switch circuit 208, a capacitor 209, and a resistor 210. The averaging circuit 240 includes a resistor 211 and a capacitor 212. The timer circuit 250 includes an inverter 213, an NMOS transistor 214, a capacitor 215, a comparator 216, and a PMOS transistor 217.

Figure 3:
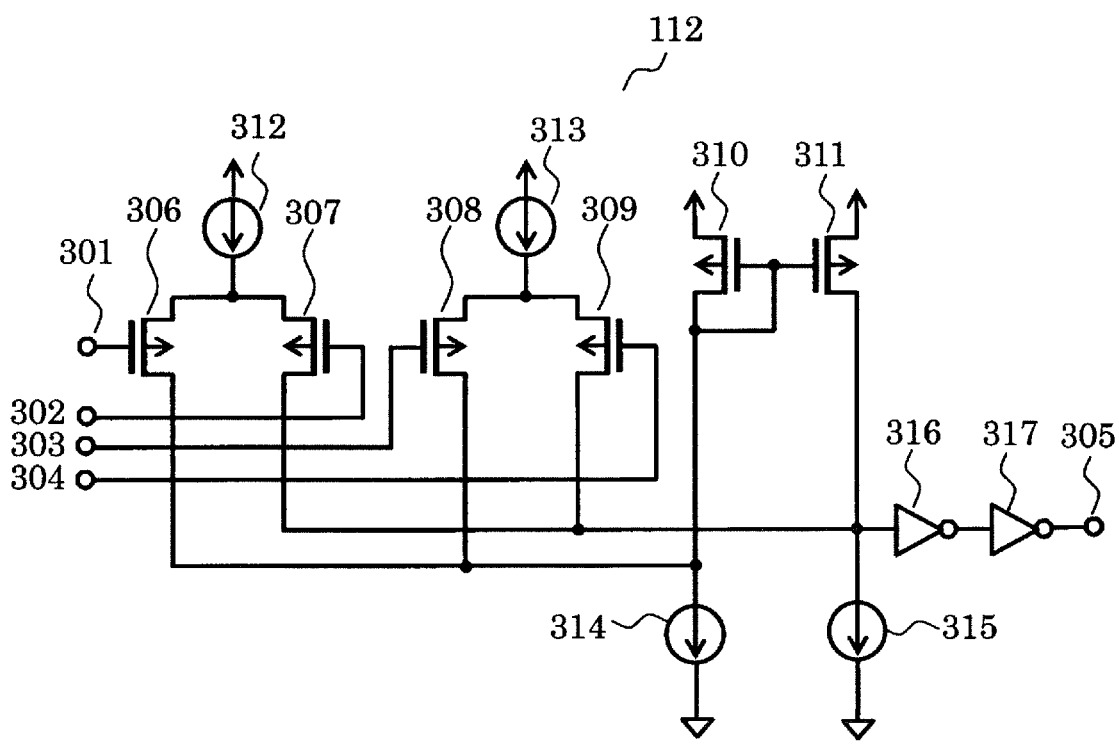
FIG. 3 is a circuit diagram illustrating a configuration of a comparator of the DC/DC converter according to this embodiment.

FIG. 3 is a circuit diagram illustrating a configuration of the comparator 112. The comparator 112 includes PMOS transistors 306, 307, 308, 309, 310, and 311, constant current circuits 312, 313, 314, and 315, inverters 316 and 317, a first non-inverting input terminal 301, a first inverting input terminal 302, a second non-inverting input terminal 303, a second inverting input terminal 304, and an output terminal 305.

Next, connections in the DC/DC converter according to this embodiment are described.

The comparator 112 has the first inverting input terminal 302 connected to an output terminal 122 of the pseudo ripple circuit 114, the first non-inverting input terminal 301 connected to an output terminal 123 of the pseudo ripple circuit 114, the second inverting input terminal 304 connected to a connection point between one terminal of the resistor 103 and one terminal of the resistor 104, the second non-inverting input terminal 303 connected to a positive electrode of the reference voltage circuit 105, and the output terminal 305 connected to a set (S) terminal of the RS-FF circuit 113. The other terminal of the resistor 103 is connected to the output terminal 102. The other terminal of the resistor 104 is connected to the ground terminal 100. The reference voltage circuit 105 has a negative electrode connected to the ground terminal 100. The RS-FF circuit 113 has a reset (R) terminal connected to the output terminal 124 of the ON-timer circuit 111, and an output terminal connected to the drive circuit 110 and the input terminal 121 of the ON-timer circuit 111. The NMOS transistor 108 has a gate connected to a first output terminal of the drive circuit 110, a drain connected to the power supply terminal 101, and a source connected to one terminal of the coil 106 and a drain of the NMOS transistor 109. The NMOS transistor 109 has a gate connected to a second output terminal of the drive circuit 110 and a source connected to the ground terminal 100. The capacitor 107 has one terminal connected to the output terminal 102 and the other terminal of the coil 106. The other terminal of the capacitor 107 is connected to the ground terminal 100.

Connections in the ON-timer circuit 111 are now described. The amplifier 204 has a non-inverting input terminal connected to a connection point between one terminal of the resistor 202 and one terminal of the resistor 201, an inverting input terminal connected to a connection point between a source of the NMOS transistor 205 and one terminal of the resistor 203, and an output terminal connected to a gate of the NMOS transistor 205. The other terminal of the resistor 202 is connected to the power supply terminal 101. The other terminal of the resistor 201 is connected to the ground terminal 100. The other terminal of the resistor 203 is connected to the ground terminal 100. The PMOS transistor 206 has a gate and a drain, which are connected to a drain of the NMOS transistor 205, and has a source connected to the power supply terminal 101. The PMOS transistor 207 has a gate connected to the gate of the PMOS transistor 206, a drain connected to one terminal of the switch circuit 208, and a source connected to the power supply terminal 101. The capacitor 209 has one terminal connected to the other terminal of the switch circuit 208, one terminal of the resistor 210, and one terminal of the resistor 211. The other terminal of the capacitor 209 is connected to the ground terminal 100. The other terminal of the resistor 210 is connected to the ground terminal 100. The other terminal of the resistor 211 is connected to one terminal of the capacitor 212. The other terminal of the capacitor 212 is connected to the ground terminal 100. The inverter 213 has an input terminal connected to the input terminal 121 and a terminal for controlling on and off of the switch circuit 208, and an output terminal connected to a gate of the NMOS transistor 214. The NMOS transistor 214 has a drain connected to one terminal of the capacitor 215 and a drain of the PMOS transistor 217, and a source connected to the ground terminal 100. The other terminal of the capacitor 215 is connected to the ground terminal 100. The PMOS transistor 217 has a gate connected to the gate of the PMOS transistor 207 and a source connected to the power supply terminal 101. The comparator 216 has a non-inverting input terminal connected to the drain of the PMOS transistor 217, an inverting input terminal connected to the one terminal of the capacitor 212, and an output terminal connected to the output terminal 124.

Connections in the comparator 112 are now described. The constant current circuit 312 has one terminal connected to the power supply terminal 101 and the other terminal connected to a source of the PMOS transistor 306 and a source of the PMOS transistor 307. The PMOS transistor 306 has a gate connected to the first non-inverting input terminal 301, and a drain connected to a connection point between one terminal of the constant current circuit 314 and a gate and a drain of the PMOS transistor 310. The PMOS transistor 307 has a gate connected to the first inverting input terminal 302 and a drain connected to an input terminal of the inverter 316. The constant current circuit 313 has one terminal connected to the power supply terminal 101 and the other terminal connected to a source of the PMOS transistor 308 and a source of the PMOS transistor 309. The PMOS transistor 308 has a gate connected to the second non-inverting input terminal 303, and a drain connected to the connection point between the one terminal of the constant current circuit 314 and the gate and the drain of the PMOS transistor 310. The PMOS transistor 309 has a gate connected to the second inverting input terminal 304 and a drain connected to the input terminal of the inverter 316. The PMOS transistor 310 has a source connected to the power supply terminal 101. The other terminal of the constant current circuit 314 is connected to the ground terminal 100. The PMOS transistor 311 has a gate connected to the gate of the PMOS transistor 310, a drain connected to the input terminal of the inverter 316, and a source connected to the power supply terminal 101. The constant current circuit 315 has one terminal connected to the input terminal of the inverter 316 and the other terminal connected to the ground terminal 100. The inverter 317 has an input terminal connected to an output terminal of the inverter 316 and an output terminal connected to the output terminal 305.

Next, an operation of the DC/DC converter according to this embodiment is described.

When a power supply voltage VDD is input to the power supply terminal 101, the DC/DC converter outputs an output voltage Vout from the output terminal 102. The resistors 103 and 104 divide the output voltage Vout to output a divided voltage VFB. The comparator 112 has a four-terminal input configuration as illustrated in FIG. 3. The comparator 112 compares a reference voltage Vref of the reference voltage circuit 105, which is input to the second non-inverting input terminal, the divided voltage VFB input to the second inverting input terminal, a voltage output from the output terminal 122 of the pseudo ripple circuit 114, which is input to the first inverting input terminal, and a voltage output from the output terminal 123 of the pseudo ripple circuit 114, which is input to the first non-inverting input terminal, and outputs a signal VS from the output terminal of the comparator 112. The ON-timer circuit 111 inputs a signal VQ from the input terminal 121, and outputs an ON-time signal VR from the output terminal 124. The RS-FF circuit 113 inputs the ON-time signal VR from the R terminal, inputs the signal VS from the S terminal, and outputs the signal VQ from the Q terminal.

Figure 4:
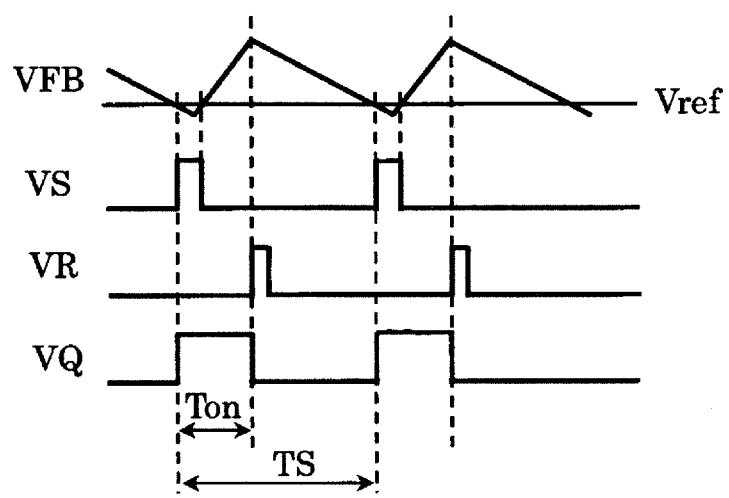
FIG. 4 is a timing chart illustrating an operation of the DC/DC converter according to this embodiment.

FIG. 4 is a timing chart illustrating the operation of the DC/DC converter according to this embodiment. When the divided voltage VFB falls below the reference voltage Vref, the signal VS becomes High level to set the signal VQ of the Q terminal of the RS-FF circuit 113 to High level. Then, the signal VQ is input to the drive circuit 110, and the NMOS transistor 108 is turned on while the NMOS transistor 109 is turned off in accordance with the signal VQ, to thereby increase the divided voltage VFB (output voltage Vout). When the ON-time signal VR output from the output terminal 124 of the ON-timer circuit 111 becomes High level, the signal VQ becomes Low level by the RS-FF circuit 113, and the NMOS transistor 108 is turned off while the NMOS transistor 109 is turned on, to thereby decrease the divided voltage VFB (output voltage Vout). A time period during which the signal VQ is at High level is represented by "Ton", and a time period from when the signal VQ becomes High level to when the signal VQ becomes High level again is represented by "TS". The output voltage Vout is generated from the output terminal 102 through control of the NMOS transistor 108 and the NMOS transistor 109 that serve as output transistors in accordance with a cycle of the time period TS.

In the comparator 112, the voltage output from the output terminal 122 of the pseudo ripple circuit 114 is input to the first inverting input terminal thereof, and is accordingly added to the divided voltage VFB input to the second inverting input terminal in the comparator 112. In this manner, the divided voltage VFB becomes a voltage containing a ripple component. Then, the voltage output from the output terminal 123 of the pseudo ripple circuit 114 is input to the first non-inverting input terminal of the comparator 112, and is accordingly added to the reference voltage Vref input to the second non-inverting input terminal in the comparator 112. Those two added signals are compared to each other, and the signal VS is output from the comparator 112.

In the amplifier 204 of the ON-timer circuit 111, a voltage V1 obtained by dividing the power supply voltage VDD by the resistor 202 and the resistor 201 is input to the non-inverting input terminal, and the amplifier 204 controls the gate of the NMOS transistor 205 so that the connection point between the source of the NMOS transistor 205 and the resistor 203 may have the voltage V1. The voltage V1 depends on the power supply voltage VDD, and hence a current depending on the power supply voltage VDD flows through the resistor 203. This current flows through the ripple generation circuit 230 and the timer circuit 250 as currents I1 having the same magnitude via a current mirror formed by the PMOS transistors 206 and 207 and a current mirror formed by the PMOS transistors 206 and 217, respectively. The capacitor 209 is charged with the current I1, and a voltage Vcref0 is generated across the capacitor 209. The current I1 is proportional to the power supply voltage VDD, and hence is expressed as I1=VDD×K, where K represents a proportionality coefficient. When a current flowing through the resistor 210 is represented by I2 and a resistance value of the resistor 210 is represented by R2, the current I2 is expressed as I2=Vcref0/R2. The switch circuit 208 is controlled to be turned on and off by the signal VQ. When the signal VQ is at High level, the switch circuit 208 is turned on, and the capacitor 209 is charged with the current I1 and discharged with the current I2. Further, when the signal VQ is at Low level, the switch circuit 208 is turned off, and electric charges of the capacitor 209 are discharged with the current I2. When an electric charge amount in charging is represented by "Q1" and an electric charge amount in discharging is represented by "Q2", the electric charge amounts are expressed as Q1=I1×Ton and Q2=I2×TS. Because Q1=Q2 is established, I1×Ton=I2×TS is established and Ton/TS=I2/I1=Vout/VDD is established. Accordingly, Vout=VDD×I2/I1 is established.

Because I2=Vcref0/R2 is established, Vout=VDD× Vcref0/R2/I1 is established and Vcref0=VoutNDD×R2×I1 is established. Accordingly, the voltage Vcref0 is a voltage that is synchronized with the signal VQ corresponding to the output voltage of the RS-FF circuit 113, contains a ripple component, and is proportional to the output voltage Vout.

A voltage Vcref of the averaging circuit 240 is obtained by removing the ripple component from the voltage Vcref0 by averaging the voltage Vcref0 with the resistor 211 and the capacitor 212. Accordingly, the voltage Vcref is a voltage that contains no ripple component and is equal to the voltage Vcref0, that is, Vcref=Vout/VDD×R2×I1 is established.

In this manner, the averaged voltage proportional to the output voltage Vout can be generated without directly using the output voltage Vout. Consequently, a malfunction of the ON-timer circuit due to noise of the output voltage Vout or the like can be prevented, and stable control can be performed with a desired ON-time.

The gate of the NMOS transistor 214 inputs the signal VQ via the inverter 213, and hence the NMOS transistor 214 is controlled to be turned on and off at the timings opposite to those by the signal VQ. A voltage of the non-inverting input terminal of the comparator 216 is represented by "Vcap". When the NMOS transistor 214 is turned off, the capacitor 215 is charged with the current I1 to increase the voltage value of the voltage Vcap. When the voltage Vcap is lower than the voltage Vcref, the ON-time signal VR of Low level is output from the output terminal 124 of the comparator 216. When the voltage Vcap is higher than the voltage Vcref, the ON-time signal VR of High level is output from the output terminal 124 of the comparator 216. Then, the signal VQ becomes Low level by the RS-FF circuit 113 so that the NMOS transistor 214 is turned on to discharge the electric charges of the capacitor 215, to thereby decrease the voltage Vcap.

When a capacitance value of the capacitor 215 is represented by "C2", the ON-time Ton is expressed as Ton=C2/I1×Vcref=C2×R2×Vout/VDD, and hence the ON-time Ton can be controlled by the duty ratio expressed by Vout/VDD. Thus, as expressed by the expression of the ON-time Ton, the ON-time Ton can be controlled by the duty ratio by causing the same current proportional to the power supply voltage VDD to flow through the PMOS transistor 207 and the PMOS transistor 217. To achieve this, it is necessary to cause the current proportional to the power supply voltage VDD to flow through both of the PMOS transistor 207 and the PMOS transistor 217. In this manner, the ON-timer circuit 111 can control the ON-time while performing the duty control, thereby being capable of operating at a constant frequency. Consequently, because the output voltage Vout is not directly used, the ON-time can be prevented from being shifted due to noise of the output voltage Vout, and a malfunction can be prevented.

Note that, as the signal VQ to be input to the input terminal 121 of the ON-timer circuit 111, the signal of the Q terminal of the RS-FF circuit 113 is used, but a signal at another node may be used as long as the signal is synchronized with the signal to be input to the gate of the NMOS transistor 108.

Further, the comparator 112 employs a comparator having four-terminal inputs, but is not limited to this configuration as long as the voltage output from the output terminal 122 of the pseudo ripple circuit 114 and the divided voltage VFB are added to each other, and the voltage output from the output terminal 123 of the pseudo ripple circuit 114 and the reference voltage Vref are added to each other. For example, an adder configured to add the voltage output from the output terminal 122 of the pseudo ripple circuit 114 and the divided voltage VFB to each other and an adder configured to add the voltage output from the output terminal 123 of the pseudo ripple circuit 114 and the reference voltage Vref to each other may be connected, and a comparator having two-terminal inputs configured to compare those signals may be employed.

Further, the resistor is used as the configuration for causing the current I2 to flow, but the configuration is not limited thereto, and another impedance element or a current source circuit may be used as long as the current I2 can be caused to flow. Further, the RS-FF circuit is used, but the configuration is not limited thereto, and another flip-flop circuit may be used. In addition, a description has been given that the same current I1 is caused to flow through the PMOS transistors 207 and 217, but it is only necessary to cause a current proportional to the power supply voltage VDD to flow therethrough, and hence the configuration is not limited to causing exactly the same current to flow therethrough.

Further, in the above-mentioned configuration of the ON-timer circuit 111 according to this embodiment, the source terminals of the PMOS transistors 206, 207, and 217 may be connected to a power supply terminal of the comparator 112 or the like, or may be connected to the power supply terminal 101. In other words, the connection destination is not limited to the power supply terminal described in this embodiment.

As described above, the DC/DC converter according to this embodiment is capable of operating the timer circuit without directly using the output voltage Vout, and hence the shift of the ON-time and a malfunction due to noise of the output voltage Vout can be prevented to achieve stable control. Further, the ON-time signal can be controlled by the duty ratio, and hence the DC/DC converter is capable of operating at a constant operating frequency even when input and output conditions are changed.

Figure 5:
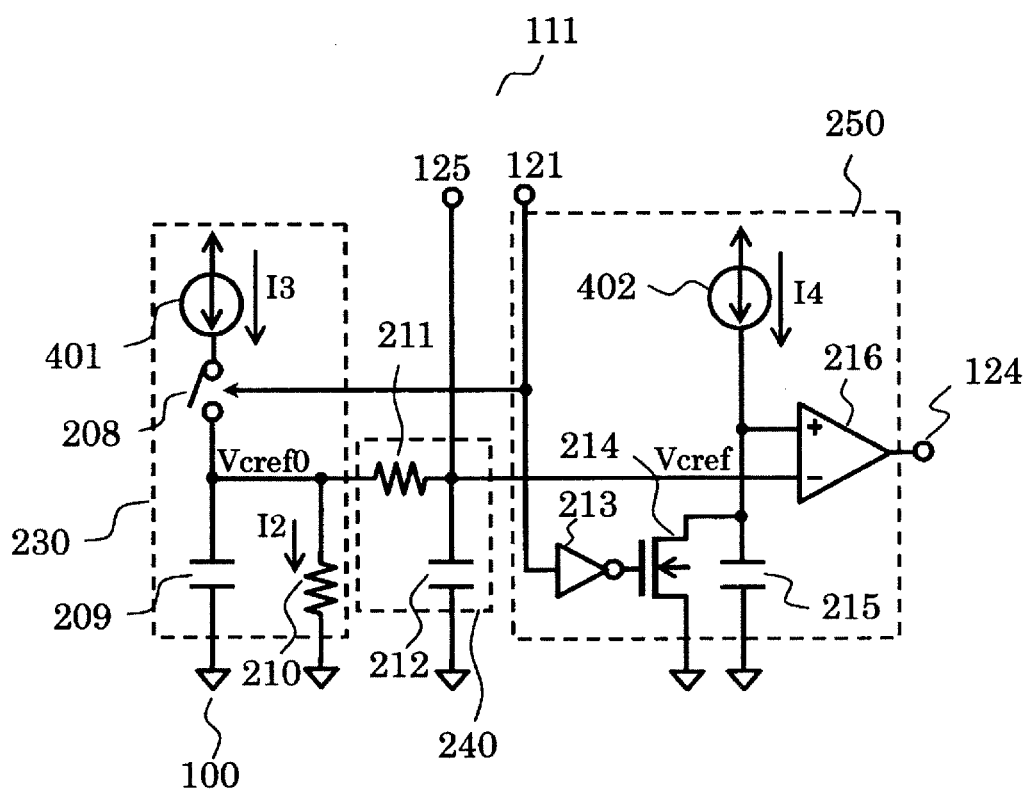
FIG. 5 is a circuit diagram illustrating another configuration of the ON-timer circuit.

FIG. 5 is a circuit diagram illustrating another example of the ON-timer circuit 111 of the DC/DC converter according to this embodiment. The difference from the ON-timer circuit of FIG. 2 resides in that the PMOS transistors 207 and 217 are changed to constant current circuits 401 and 402, and the PMOS transistor 206, the NMOS transistor 205, the amplifier 204, and the resistors 202, 201, and 203 are removed. The other circuits are the same as those in the ON-timer circuit of FIG. 2.

An operation of the ON-timer circuit of FIG. 5 is now described. A current flowing through the constant current circuit 401 is represented by "I3", a current flowing through the constant current circuit 402 is represented by "I4", and a current flowing through the resistor 210 is represented by "I2".

When a resistance value of the resistor 210 is represented by "R2", the current I2 is expressed as I2=Vcref0/R2. The switch circuit 208 is controlled to be turned on and off by the signal VQ. When the signal VQ is at High level, the switch circuit 208 is turned on, and the capacitor 209 is charged with the current I3 and discharged with the current I2. Further, when the signal VQ is at Low level, the switch circuit 208 is turned off, and electric charges of the capacitor 209 are discharged with the current I2. When an electric charge amount in charging is represented by "Q1" and an electric charge amount in discharging is represented by "Q2", the electric charge amounts are expressed as Q1=I3×Ton and Q2=I2×TS. Because Q1=Q2 is established, I3×Ton=I2×TS is established and Ton/TS=I2/I3=Vout/VDD is established. Accordingly, Vout=VDD×I2/I3 is established.

Because I2=Vcref0/R2 is established, Vout=VDD× Vcref0/R2/I3 is established and Vcref0=Vout/VDD×R2×I3 is established. In this manner, the voltage Vcref0 is a voltage that is synchronized with the signal VQ corresponding to the output voltage of the RS-FF circuit 113, contains a ripple component, and is proportional to the output voltage Vout.

A voltage Vcref of the averaging circuit 240 is obtained by removing the ripple component from the voltage Vcref0 by averaging the voltage Vcref0 with the resistor 211 and the capacitor 212. Accordingly, the voltage Vcref is a voltage that contains no ripple component and is equal to the voltage Vcref0, that is, Vcref=Vout/VDD×R2×I3 is established.

In this manner, the averaged voltage proportional to the output voltage Vout can be generated without directly using the output voltage Vout. Consequently, a malfunction of the ON-timer circuit due to noise of the output voltage Vout or the like can be prevented, and stable control can be performed with a desired ON-time.

The gate of the NMOS transistor 214 inputs the signal VQ via the inverter 213, and hence the NMOS transistor 214 is controlled to be turned on and off at the timings opposite to those by the signal VQ. A voltage of the non-inverting input terminal of the comparator 216 is represented by "Vcap". When the NMOS transistor 214 is turned off, the capacitor 215 is charged with the current I4 to increase the voltage value of the voltage Vcap. When the voltage Vcap is lower than the voltage Vcref, the ON-time signal VR of Low level is output from the output terminal 124 of the comparator 216. When the voltage Vcap is higher than the voltage Vcref, the ON-time signal VR of High level is output from the output terminal 124 of the comparator 216. Then, the signal VQ becomes Low level by the RS-FF circuit 113 so that the NMOS transistor 214 is turned on to discharge the electric charges of the capacitor 215, to thereby decrease the voltage Vcap.

When a capacitance value of the capacitor 215 is represented by "C2", the ON-time Ton is expressed as Ton=C2/ I4×Vcref=C2×I3/I4×R2×Vout/VDD. In the case of I3=I4, the ON-time Ton is expressed as Ton=C2×R2×Vout/VDD, and hence the ON-time Ton can be controlled by the duty ratio expressed by Vout/VDD. Thus, as expressed by the expression of the ON-time Ton, the ON-time Ton can be controlled by the duty ratio by causing a constant current to flow through the PMOS transistor 207 and the PMOS transistor 217. In this manner, the ON-time can be controlled while the duty control is performed, and hence the ON-timer circuit 111 is capable of operating at a constant frequency. Consequently, because the output voltage Vout is not directly used, the ON-time can be prevented from being shifted due to noise of the output voltage Vout, and a malfunction can be prevented.

Note that, as the signal VQ to be input to the input terminal 121 of the ON-timer circuit 111, the signal of the Q terminal of the RS-FF circuit 113 is used, but a signal at another node may be used as long as the signal is synchronized with the signal to be input to the gate of the NMOS transistor 108.

Further, the comparator 112 employs a comparator having four-terminal inputs, but is not limited to this configuration as long as the voltage output from the output terminal 122 of the pseudo ripple circuit 114 and the divided voltage VFB are added to each other, and the voltage output from the output terminal 123 of the pseudo ripple circuit 114 and the reference voltage Vref are added to each other. For example, an adder configured to add the voltage output from the output terminal 122 of the pseudo ripple circuit 114 and the divided voltage VFB to each other and an adder configured to add the voltage output from the output terminal 123 of the pseudo ripple circuit 114 and the reference voltage Vref to each other may be connected, and a comparator having two-terminal inputs configured to compare those signals may be employed.

Further, the resistor is used as the configuration for causing the current I2 to flow, but the configuration is not limited thereto, and another impedance element or a current source circuit may be used as long as the current I2 can be caused to flow. Further, the RS-FF circuit is used, but the configuration is not limited thereto, and another flip-flop circuit may be used. In addition, a description has been given that the same current is caused to flow through the constant current circuits 401 and 402, but the configuration is not limited thereto. For example, a current proportional to the constant current circuit 401 may be caused to flow through the constant current circuit 402, or different currents may be caused to flow through the constant current circuit 401 and the constant current circuit 402.

Further, in the above-mentioned configuration of the ON-timer circuit 111 according to this embodiment, the constant current circuits 401 and 402 may be connected to a power supply terminal of the comparator 112 or the like, or may be connected to the power supply terminal 101. In other words, the connection destination is not limited to the power supply terminal described in this embodiment.

As described above, the DC/DC converter according to this embodiment including the ON-timer circuit of FIG. 5 is capable of operating the timer circuit without directly using the output voltage Vout, and hence the shift of the ON-time and a malfunction due to noise of the output voltage Vout can be prevented to achieve stable control. Further, the ON-time signal can be controlled by the duty ratio, and hence the DC/DC converter is capable of operating at a constant operating frequency even when input and output conditions are changed.

Figure 6:
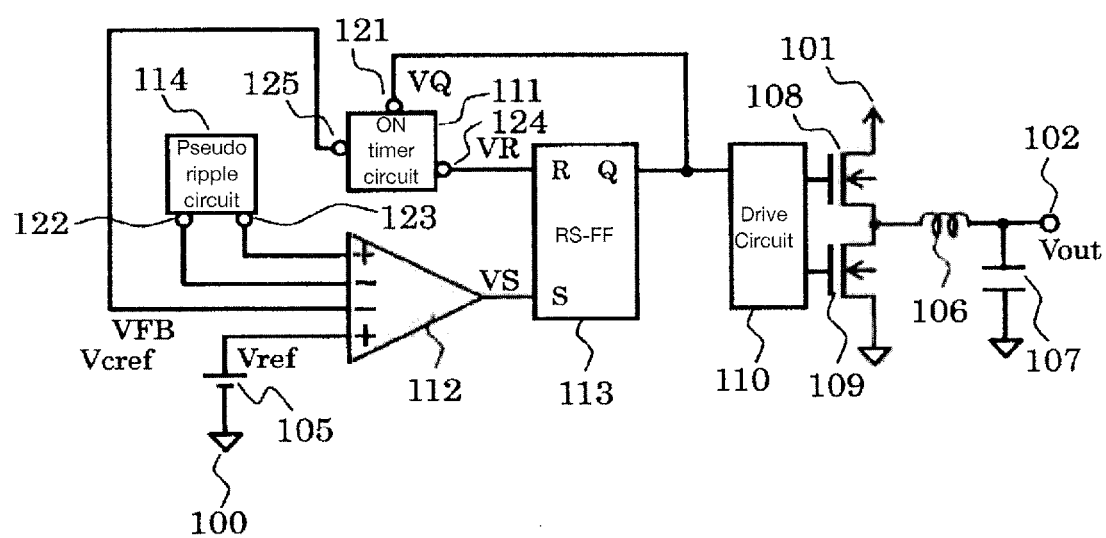
FIG. 6 is a circuit diagram illustrating another configuration of the DC/DC converter according to this embodiment.
Figure 7:
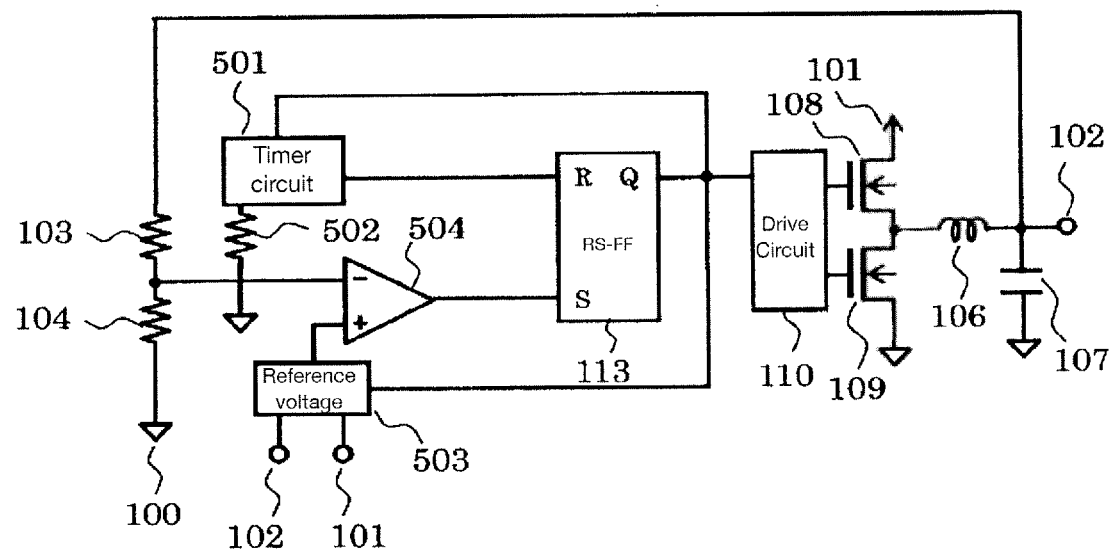
FIG. 7 is a circuit diagram illustrating a configuration of a related-art DC/DC converter.

FIG. 6 is a circuit diagram illustrating another example of the DC/DC converter using the ON-timer circuit according to this embodiment. The difference from the DC/DC converter according to the embodiment of FIG. 1 resides in that the voltage Vcref is output from the output terminal 125 of the ON-timer circuit 111 and input to the second inverting input terminal of the comparator 112 so that the resistors 103 and 104 configured to divide the output voltage Vout are removed.

An operation of the DC/DC converter of FIG. 6 is described.

When the power supply voltage VDD is input to the power supply terminal 101, the DC/DC converter outputs the output voltage Vout from the output terminal 102. The comparator 112 has a four-terminal input configuration as illustrated in FIG. 3. The comparator 112 compares the reference voltage Vref of the reference voltage circuit 105, which is input to the second non-inverting input terminal, the voltage Vcref output from the ON-timer circuit 111, which is input to the second inverting input terminal, the voltage output from the output terminal 122 of the pseudo ripple circuit 114, which is input to the first inverting input terminal, and the voltage output from the output terminal 123 of the pseudo ripple circuit 114, which is input to the first non-inverting input terminal, and outputs the signal VS from the output terminal of the comparator 112. The ON-timer circuit 111 inputs the signal VQ from the input terminal 121, outputs the ON-time signal VR from the output terminal 124, and outputs the voltage Vcref from the output terminal 125. The RS-FF circuit 113 inputs the ON-time signal VR from the R terminal, inputs the signal VS from the S terminal, and outputs the signal VQ from the Q terminal.

In the ON-timer circuit 111 according to this embodiment, the averaging circuit 240 generates an averaged voltage Vcref proportional to the output voltage Vout without directly using the output voltage Vout. The output voltage Vcref of the averaging circuit 240 is Vcref=Vout/VDD×R2×I1, where I1=VDD×K. Accordingly, Vcref=Vout/VDD×R2×VDD×K is established and Vcref=Vout×R2×K is established. Thus, the output voltage Vcref and the output voltage Vout have a proportional relationship, and Vout=Vcref×R2×K is estab-lished. Consequently, a desired output voltage Vout can be obtained through the control of the output voltage Vcref.

When the output voltage Vcref of the averaging circuit 240 falls below the reference voltage Vref, the signal VS becomes High level to set the signal VQ of the Q terminal of the RS-FF circuit 113 to High level. Then, the signal VQ is input to the drive circuit 110, and the NMOS transistor 108 is turned on while the NMOS transistor 109 is turned off in accordance with the signal VQ, to thereby increase the output voltage Vout. When the ON-time signal VR output from the output terminal 124 of the ON-timer circuit 111 becomes High level, the signal VQ becomes Low level by the RS-FF circuit 113, and the NMOS transistor 108 is turned off while the NMOS transistor 109 is turned on, to thereby decrease the output voltage Vout. A time period during which the signal VQ is at High level is represented by "Ton", and a time period from when the signal VQ becomes High level to when the signal VQ becomes High level again is represented by "TS". The output voltage Vout is generated from the output terminal 102 through control of the NMOS transistor 108 and the NMOS transistor 109 that serve as output transistors in accordance with a cycle of the time period TS.

As described above, the DC/DC converter according to this embodiment is capable of operating the timer circuit without directly using the output voltage Vout, and hence the shift of the ON-time and a malfunction due to noise of the output voltage Vout can be prevented to achieve stable control. Further, the ON-time signal can be controlled by the duty ratio, and hence the DC/DC converter is capable of operating at a constant operating frequency even when input and output conditions are changed.

Note that, the ON-timer circuit having the configuration according to this embodiment is not limited to be used for the DC/DC converter having the configuration according to this embodiment. In the control of the DC/DC converter having the configuration according to this embodiment, in order to keep the output voltage Vout constant, the relationship of the power supply voltage VDD and the duty is set so that Vout=VDD×duty is established. As long as the DC/DC converter performs such control, the output voltage Vout can be controlled by the ON-timer circuit having the configuration according to this embodiment. For example, a forward DC/DC converter is exemplified.

In the forward DC/DC converter, control is performed based on Vout=VDD×duty×Ns/Np, where Vout represents the output voltage, VDD represents the power supply voltage, Np represents a primary-side winding of a coil as a load, Ns represents a secondary-side winding of the coil as the load. Because Ns/Np is a fixed constant, the output voltage Vout is controlled by the same duty ratio as that of the DC/DC converter having the configuration according to this embodiment. In particular, in the case of Ns=Np, the same control is performed as that of the DC/DC converter having the configuration according to this embodiment.

In the configuration of a general forward DC/DC converter, a switch element is connected to a ground terminal, and when the switch element is turned on and off, the switch element controls a current flowing through the coil as the load, to thereby control the output voltage Vout. A control terminal for turning on and off the switch element is connected to a drive circuit. By inputting the output signal VQ of the RS-FF circuit having the configuration according to this embodiment to the drive circuit, the output voltage Vout can be generated.

As described above, the ON-timer circuit having the configuration according to this embodiment is not limited to be used for the DC/DC converter having the configuration according to this embodiment, and may be used for a DC/DC converter having another configuration.

Further, the DC/DC converter of the present invention has been described as including the pseudo ripple circuit 114, but may have a configuration in which the voltage Vcref0 of the ripple generation circuit 230 is input to the first inverting input terminal of the comparator 112 and the voltage Vcref of the averaging circuit 240 is input to the first non-inverting input terminal. When the DC/DC converter is configured in this manner, the same effects can be obtained even without the pseudo ripple circuit 114.

What is claimed is:

1. A DC/DC converter, comprising:
   a first comparator configured to output a difference between a voltage obtained by adding a pseudo ripple component corresponding to an output voltage output from an output transistor and a voltage corresponding to the output voltage to each other, and a voltage obtained by adding the pseudo ripple component and a reference voltage to each other;
   an ON-timer circuit configured to input a control signal, which is synchronized with a signal input to a gate of the output transistor, and output an ON-time signal;
   a flip-flop circuit configured to input an ON-time signal of the ON-timer circuit and an output signal of the first comparator; and
   a drive circuit configured to input an output signal of the flip-flop circuit to control the output transistor,
   the ON-timer circuit comprising:
      a ripple generation circuit configured to generate and output
      a ripple component based on the control signal; an averaging circuit configured to output a signal obtained by averaging the ripple component; and
      a timer circuit configured to generate and output the ON-time signal based on the signal of the averaging circuit and the control signal.

2. The DC/DC converter according to claim 1, wherein the ripple generation circuit comprises:
   a first current source;
   a switch circuit including one terminal connected to the first current source, and configured to be controlled by the control signal;
   a first capacitor connected to another terminal of the switch circuit; and
   an impedance element connected to said another terminal of the switch circuit.

3. The DC/DC converter according to claim 2, wherein the timer circuit comprises:
   an inverter configured to input the control signal;
   a transistor including a gate connected to an output terminal of the inverter;
   a second capacitor connected to a drain of the transistor;
   a second current source connected to the drain of the transistor;
   a second comparator including a non-inverting input terminal connected to the drain of the transistor and an inverting input terminal connected to an output terminal of the averaging circuit.

4. The DC/DC converter according to claim 3, wherein the first current source and the second current source are proportional to a power supply voltage.

5. The DC/DC converter according to claim 3, wherein the second current source is proportional to a voltage value of the first current source.

6. The DC/DC converter according to claim 3, wherein the voltage corresponding to the output voltage, which is input to the first comparator, comprises an output voltage of the averaging circuit.

* * * * *